(12) United States Patent
Elzur

(10) Patent No.: US 7,937,554 B2
(45) Date of Patent: May 3, 2011

(54) SYSTEM AND METHOD FOR MANAGING MEMORY

(75) Inventor: Uri Elzur, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 2007 days.

(21) Appl. No.: 10/704,891

(22) Filed: Nov. 10, 2003

(65) Prior Publication Data

US 2004/0098369 A1 May 20, 2004

Related U.S. Application Data

(60) Provisional application No. 60/425,959, filed on Nov. 12, 2002.

(51) Int. Cl.
*G06F 13/00* (2006.01)

(52) U.S. Cl. ........ 711/203; 711/170; 711/171; 711/172; 711/173

(58) Field of Classification Search .................. 370/252; 709/226; 711/137, 163, 206, 210, 214, 216, 711/220, 203

See application file for complete search history.

(56) References Cited

U.S. PATENT DOCUMENTS

| 5,293,595 | A | * | 3/1994 | Caldarale et al. | 711/210 |
| 5,579,501 | A | * | 11/1996 | Lipton et al. | 711/216 |
| 5,845,331 | A | * | 12/1998 | Carter et al. | 711/163 |
| 6,092,154 | A | * | 7/2000 | Curtis et al. | 711/137 |
| 6,108,761 | A | * | 8/2000 | Johnson et al. | 711/214 |
| 6,393,544 | B1 | * | 5/2002 | Bryg et al. | 711/220 |
| 6,807,155 | B1 | * | 10/2004 | Subramanian | 370/252 |
| 6,859,867 | B1 | * | 2/2005 | Berry | 711/206 |
| 6,877,044 | B2 | * | 4/2005 | Lo et al. | 710/2 |
| 2004/0049580 | A1 | * | 3/2004 | Boyd et al. | 709/226 |
| 2004/0073622 | A1 | * | 4/2004 | McDaniel et al. | 709/212 |
| 2006/0236063 | A1 | * | 10/2006 | Hausauer et al. | 711/170 |

OTHER PUBLICATIONS

E. Morancho, J.M. Llabería, À. Olivé and M. Jiménez. "One-Cycle Zero-Offset Loads" In Second IASTED International Conference European Parallel and Distributes Systems (EuroPDS-98) pp. 87-93. Baden bei Wein, Austria. Jul. 1998.*

B.L. Jacob and T.N. Mudge, "Virtual Memory in Contemporary Microprocessors," IEEE Micro, Aug. 1998.*

Patterson et al., A Case for Redundant Arrays of Inexpensive Disks (RAID), Dept. of Elect. Engr. and Computer Sciences, Univ. of Cal., Berkeley, 1988 ACM 0-89791-268-3/88/006/0109, pp. 109-116.*

Chadalapaka et al., A Study of iSCSI Extensions for DMA (iSER), Aug. 2003, pp. 209-219.* iSER on Infinibad Networks, Publication by IBM, pp. 1-9.*

* cited by examiner

*Primary Examiner* — Hetul Patel

(74) *Attorney, Agent, or Firm* — McAndrews, Held & Malloy, Ltd.

(57) ABSTRACT

Systems and methods that manage memory are provided. In one embodiment, a system for communications may include, for example, a memory management system that may handle a first application employing a virtual address based tagged offset and a second application employing a zero based tagged offset with a common set of memory algorithms.

27 Claims, 5 Drawing Sheets

| Ethernet (18 Bytes) |||
|---|---|---|
| TCP/IP (40 Bytes) |||
| MPA Header | DDP Control | RDMAP Control |
| Invalidate STag (4 Bytes) |||
| Queue Number (4 Bytes) |||
| Send Message Sequence Number (4 Bytes) |||
| Send Message Offset (4 Bytes) |||
| iSER Header (4 Bytes) |||
| Data Source/Sink STag (4 Bytes) |||
| Data Source/Sink STag (4 Bytes) |||
| Data Source FBO (2 Bytes) || Data Sink FBO or RSVD (2 Bytes) |
| iSCSI "SCSI Command PDU" (48+ Bytes) |||
| MPA CRC (4 Bytes) |||
| Ethernet CRC (4 Bytes) |||

FIG. 2

| Ethernet (18 Bytes) |||
|---|---|---|
| TCP/IP (40 Bytes) |||
| MPA Header | DDP Control | RDMAP Control |
| Invalidate STag (4 Bytes) |||
| Queue Number (4 Bytes) |||
| Send Message Sequence Number (4 Bytes) |||
| Send Message Offset (4 Bytes) |||
| iSER Header (4 Bytes) |||
| Data Source/Sink STag (4 Bytes) |||
| Data Source/Sink STag (4 Bytes) |||
| Data Source/Sink FBO or RSVD (8 Bytes) |||
| iSCSI "SCSI Command PDU" (48+ Bytes) |||
| MPA CRC-32C (4 Bytes) |||
| Ethernet CRC (4 Bytes) |||

FIG. 4

SYSTEM AND METHOD FOR MANAGING MEMORY

CROSS-REFERENCE TO RELATED APPLICATION

This application makes reference to, claims priority to and claims benefit from U.S. Provisional Patent Application Ser. No. 60/425,959, entitled "Joint Memory Management for User Space and Storage" and filed on Nov. 12, 2002.

INCORPORATION BY REFERENCE

The above-referenced United States patent application is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

For a conventional storage application such as small computer system interface (SCSI), Fibre Channel (FC) or Internet SCSI (iSCSI), a memory management system can manage, for example, a registered memory region in a host memory system. The memory region, which may be exposed to other conventional storage applications (e.g., remote applications), may be characterized by a reference number such as a steering tag (STag), a memory region length and an initial tagged offset (TO) of zero. Conventional storage applications do not use and would not be compatible with systems that use non-zero initial offsets.

The incompatibility of conventional storage applications and their respective memory management systems with applications and memory management systems that do use nonzero initial offsets has created separate and distinct memory management architectures and processes. For example, a host may have a first memory management system with a first memory structure dedicated for conventional storage applications and a first set of algorithms for handling memory management. The host may also have a second memory management system with a second memory structure dedicated for other applications that use nonzero initial offsets and a second set of algorithms for handling memory management. In addition, the memory management system must know the type of application with which the memory management system is dealing.

Further limitations and disadvantages of conventional and traditional approaches will become apparent to one of ordinary skill in the art through comparison of such systems with at least some aspects of the present invention as set forth in the remainder of the present application with reference to the drawings.

BRIEF SUMMARY OF THE INVENTION

Aspects of the present invention may be found in, for example, systems and methods that manage memory. In one embodiment, aspects of the present invention may provide a system for communications. The system may include, for example, a memory management system that may handle a first application employing a virtual address based tagged offset and a second application employing a zero based tagged offset with a common set of memory algorithms.

In another embodiment, aspects of the present invention may provide a method that manages memory. The method may include, for example, one or more of the following: handling a first application using a virtual address based offset and a second application using a zero based offset in a single memory management architecture; and using a single set of management algorithms for both the first application and the second application.

In yet another embodiment, aspects of the present invention may provide a method that handles memory accesses by a user space application and a non-user space application. The method may include, for example, one or more of the following: advertising a memory region using at least one of a virtual address based tagged offset and a zero based tagged offset; and storing the at least one of the virtual address based tagged offset and the zero based tagged offset in a common format in a memory management system.

These and other features and advantages of the present invention may be appreciated from a review of the following detailed description of the present invention, along with the accompanying figures in which like reference numerals refer to like parts throughout.

BRIEF DESCRIPTION OF THE DRAWINGS

FIG. 2 shows an embodiment of a message according to the present invention.

FIG. 4 shows another embodiment of a message according to the present invention.

DETAILED DESCRIPTION OF THE INVENTION

Some aspects of the present invention may be found, for example, in systems and methods that manage memory. Some embodiments according to the present invention may use, for example, a common set of memory management algorithms (e.g., arithmetic algorithms) for user space applications and non-user space applications (e.g., kernel applications, some storage applications and other types of applications). Other embodiments according to the present invention may support virtual address based offsets for use with, for example, user space applications and may support first byte offsets or zero based offsets for use with, for example, some storage applications. Yet other embodiments according to the present invention may provide a common set of calculations and a common memory management system for use with, for example, user space storage applications and non-user space storage applications.

Figure 1:
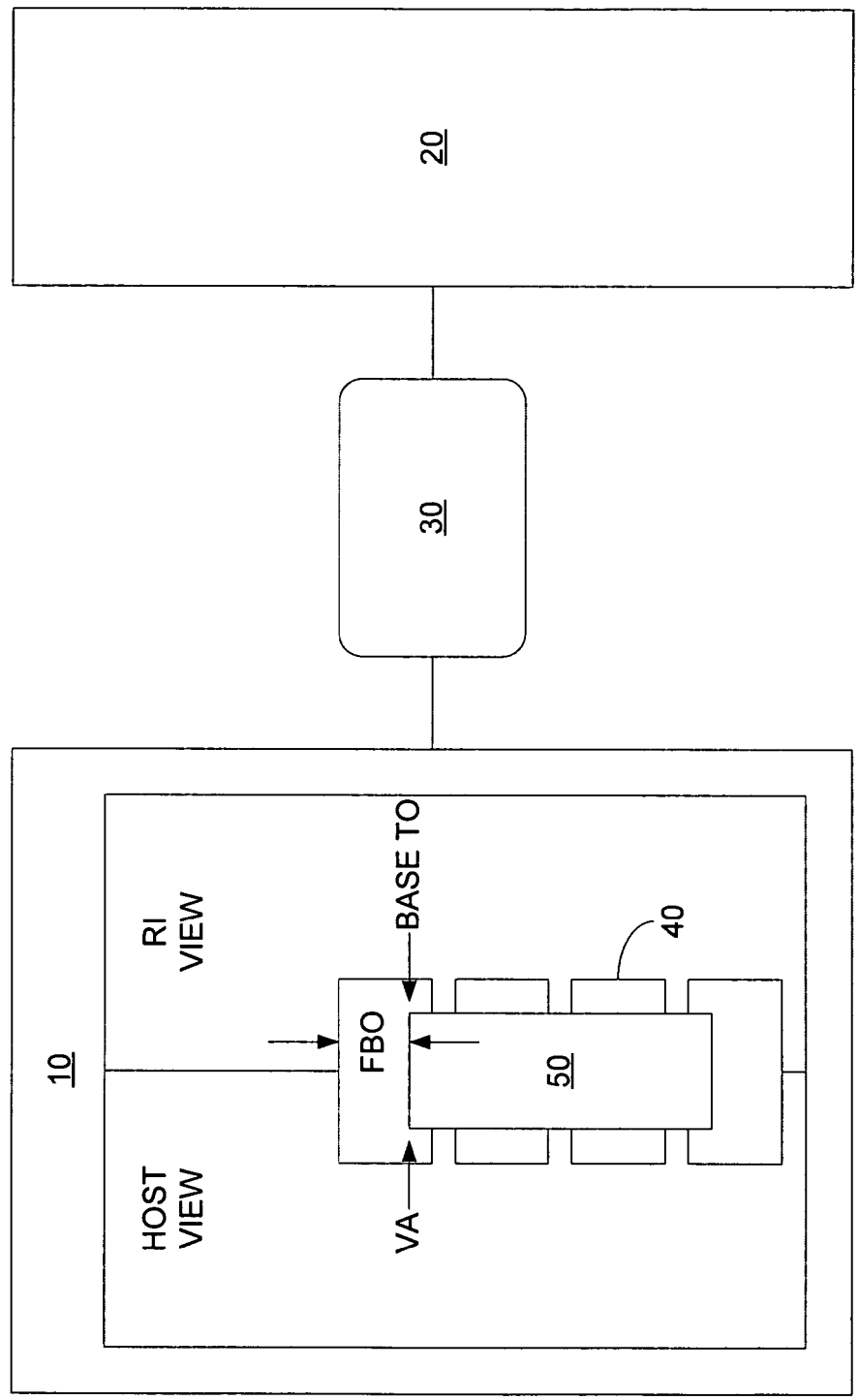
FIG. 1 shows a representation of an embodiment of a system that facilitates communications between nodes according to the present invention.
Figure 5:
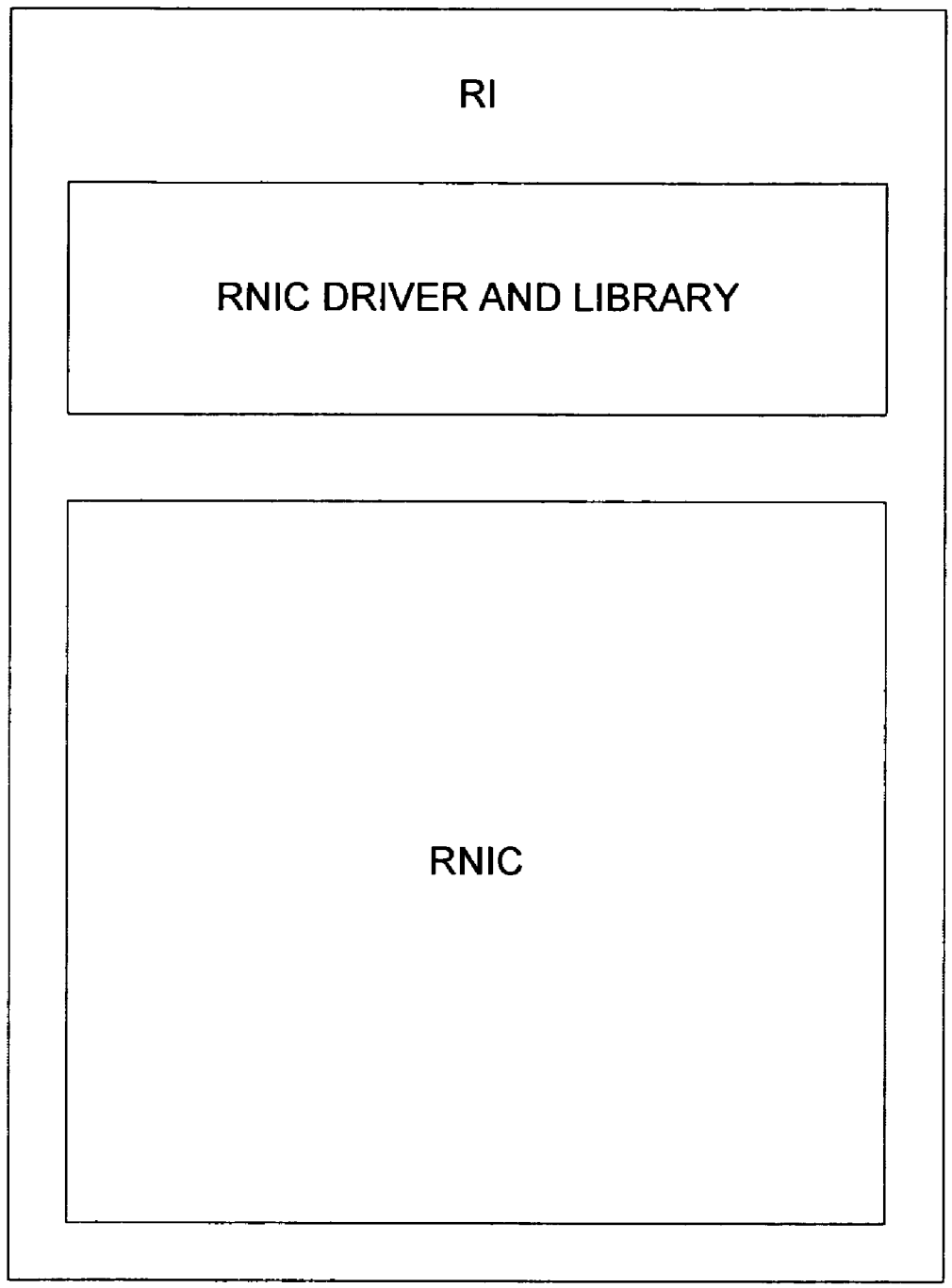
FIG. 5 shows a block diagram illustrating an embodiment of a remote-direct-memory-access-enabled network interface card interface (RI) according to the present invention.

FIG. 1 shows a representation of an embodiment of a system that facilitates communications between nodes according to the present invention. The system may include, for example, a first node 10 (e.g., a local peer), a second node 20 (e.g., a remote peer) and a network 30. The first node 10 may be coupled to the second node 20 via the network 30. The first node 10 may include, for example, a host and one or more remote-direct-memory-access (RDMA)-enabled network interface card interfaces (RIs) and a host memory. An RI may include, for example, an RDMA-enabled network interface card (RNIC) and an RNIC driver as shown in FIG. 5. The host memory may include, for example, buffers 40. A memory region 50 may reside within the host memory and may span one or more buffers 40. The memory region 50 may include, for example, one or more memory windows. Although some discussions herein may relate to memory regions, the same discussions may also find application with respect to memory windows.

The memory region 50 may be registered by the host. For example, a host application (e.g., a consumer application or an upper layer protocol (ULP) application) may register the memory region 50 with the RNIC. Some of the parameters used to register the memory region 50 may include, for example, a steering tag (STag), a base tagged offset (Base TO) and a length of the memory region 50. In one embodiment, the STag may be associated with a list of buffers 40 stored in a physical address table. The Base TO may be associated with the first byte of the memory region 50 which, for example, may be disposed at an offset within the first buffer of the memory region 50. A first base offset (FBO) may be associated with an offset into the first buffer listed in the physical address table at which the memory region begins. The buffers 40 may be of the same size or of varying sizes. The buffers 40 may include, for example, a plurality of pages, a plurality of blocks or other types of groupings.

The memory region 50 may be accessed via at least two types of addresses. In one embodiment, the host may access the memory region 50 via virtual addresses, which may represent physical addresses. The RI may access the memory region 50 via physical addresses. A physical address may be determined, for example, based upon an STag and a TO via a memory translation and protection table (memory TPT).

The basis for accessing the memory region 50 may also depend upon, for example, the type of applications that are communicating. For example, a user space application might employ virtual address based tagged offsets (VA Based TOs). In another example, a kernel space application (e.g., a storage application) might employ zero based tagged offsets (Zero Based TO). Storage applications may be, for example, kernel space applications or user space applications.

In operation, for a user space application, the node 10 may send a ULP message advertisement to the node 20. The ULP message advertisement may include, for example, an STag, a VA Based TO and a length of the advertised memory region. The node 20 (e.g., a remote peer) may then request an operation (e.g., an RDMA operation) using the advertised memory region. For example, in an RDMA write message, the node 20 may set the TO equal to the VA Based TO for the first writing of data. In the subsequent writing of data, the node 20 may set the TO equal to an offset equal to the data size previously written plus the VA Based TO.

For a non-user space application (e.g., some storage applications), the node 10 may send a ULP message advertisement to the node 20. The ULP message advertisement may include, for example, an STag, an FBO and a length of the advertised memory region. The FBO may be indicative of a Zero Based TO. The node 20 may then request an operation using the advertised memory region. For example, in an RDMA write message, the node 20 may set the TO equal to the FBO for the first writing of data. In the subsequent writing of data, the node 20 may set the TO equal to an offset equal to the data size previously written plus the FBO. In one embodiment, the application or the ULP that may calculate access or buffer boundaries may keep using Zero Based TO. The application or the ULP may be oblivious to the FBO. A lower layer protocol (e.g., an iSER or an RI) may add the FBO to the TO field of requests sent to the node 20.

For either a user space application or a non-user space application (e.g., a kernel space application), the RNIC may be adapted to perform a common set of calculations. In the case in which pages are employed, a common set of calculations may include, for example, one or more of the following:

Page Offset=TO mod Pagesize;
PAT Index=[TO−Base TO+(Base TO mod Pagesize)]/Pagesize;
Low Limit Check: TO≧Base TO; and
High Limit Check: TO<Base TO+Length.

FIG. 2 shows an embodiment of a message according to the present invention. The message may be, for example, an Internet small computer system interface (iSCSI) over RDMA (iSER) message. The message may include fields such as, for example, an Ethernet header, a TCP/IP header, a marker-based framing protocol data unit (FPDU) aligned (MPA) framing protocol header, direct data placement protocol (DDP) control, RDMAP control, an invalidate STag, a queue number, a send message sequence number, a send message offset, an iSER header, a data source/sink STag, a data source/sink STag, a data source FBO, a data sink FBO or reserved, an iSCSI "SCSI Command Protocol Data Unit (PDU)", an MPA CRC field and an Ethernet cyclical redundancy check (CRC). In one embodiment, a flexible iSER header might not be needed.

Figure 3:
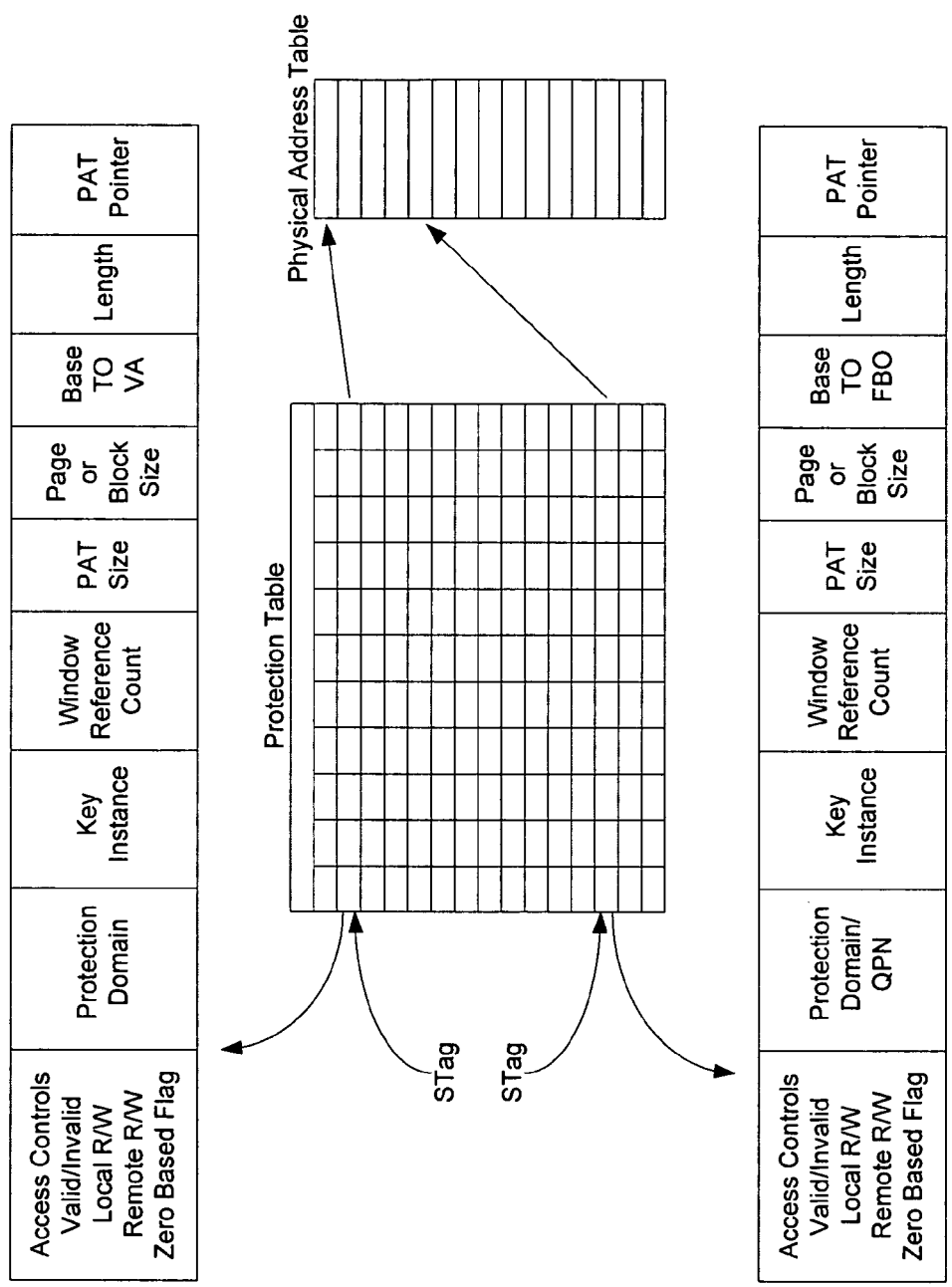
FIG. 3 shows an embodiment of a memory management system according to the present invention.

FIG. 3 shows an embodiment of a memory management system according to the present invention. The memory management system may be, for example, an RNIC memory management system. In one embodiment, the RNIC memory management system may include, for example, a protection table (e.g., a memory TPT) and a physical address table. The protection table may be adapted to translate STags and possibly other associated information (e.g., TOs) into physical memory addresses of the host memory. The physical address table may include, for example, one or more lists of physical addresses in the memory region associated with one or more STags or one or more lists of physical addresses of pages or blocks in the memory region associated with one or more STags.

For user space applications, protection table entries may include fields related to one or more of the following: access controls relating to one or more of, for example, STag validity/invalidity, local read/write rights, remote read/write rights and a zero-based flag; a protection domain; a key instance; a window reference count; a PAT size; a page/block size; Base TO (VA); a length; and a PAT pointer. In one embodiment, full virtual addressing may be used for user space applications.

For non-user space applications such as, for example, some storage applications, protection table entries may include fields related to one or more of the following: access controls relating to one or more of, for example, STag validity/invalidity, local read/write rights, remote read/write rights and a zero-based flag; a protection domain/QPN; a key instance; a window reference count; a PAT size; a page/block size; a Base TO (FBO); a length; and a PAT pointer. In one embodiment, the FBO may be used for non-user space applications. In another embodiment, the FBO may be less than 64 KB. In yet another embodiment, the storage offset into the first buffer of the memory region may not exceed 512 B.

In one embodiment, both user space applications and non-user space applications may share the same structures of the RNIC memory management system. In another embodiment, a flag may not be needed to signify whether or not VA based addressing or Zero based addressing is being used. Whether the addressing is VA based or Zero based, some embodiments according to the present invention may employ a common set of arithmetic algorithms. In yet another embodiment, the RNIC memory management system may have a single mode for user space applications and non-user space applications. Accordingly, some embodiments of the present invention may be applicable to storage applications whether or not the storage applications are non-user space applications (e.g., kernel space storage applications) or user space applications (e.g., some iSER applications).

FIG. 4 shows another embodiment of a message according to the present invention. The message format may be, for example, an iSER control PDU format. Referring to FIG. 4, iSCSI control PDUs may be embedded, for example, in Send messages or Send with Solicited Event messages. In one embodiment, a flexible header may be used to accommodate the addition of the TO information. The message may include fields such as, for example, an Ethernet header, a TCP/IP header, an MPA framing protocol header, DDP control, RDMAP control, an invalidate STag, a queue number, a send message sequence number, a send message offset, an iSER header, a data source/sink STag, a data source/sink STag, reserved or a data source/sink FBO that can be used, for example, in calculating the TO field for use by subsequent RDMA messages, an iSCSI "SCSI Command PDU, an MPA CRC-32C and an Ethernet CRC.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for handling memory accesses by a user space application and a non-user space application, comprising:
   advertising a memory region using at least one of a virtual address based tagged offset and a zero based tagged offset, the advertising of the memory region comprising advertising the memory region using a first base offset (FBO); and
   inserting, via a lower layer protocol application or a device, information related to the FBO in a message advertising the memory region.

2. The method according to claim 1, comprising:
   storing the at least one of the virtual address based tagged offset and the zero based tagged offset in a common format in a memory management system.

3. The method according to claim 1, comprising:
   using a common set of memory management algorithms for an application using the virtual address based tagged offset or an application using the zero based tagged offset.

4. The method according to claim 1, wherein an upper layer protocol application or an upper layer protocol device is unaware of the use of the FBO.

5. The method according to claim 1, wherein the inserting is via the lower layer protocol application.

6. The method according to claim 1, wherein the inserting is via the device.

7. The method according to claim 6, wherein the device is a lower layer protocol device.

8. The method according to claim 6, wherein the device is a remote direct memory access (RDMA) interface.

9. The method according to claim 6, wherein the device is a network interface card.

10. The method according to claim 1, wherein the advertising of the memory region uses the zero based tagged offset.

11. The method according to claim 1, wherein the advertising of the memory region uses the virtual address based tagged offset.

12. The method according to claim 1, wherein the lower layer protocol application uses RDMA.

13. The method according to claim 1, wherein the advertising of the memory region uses the virtual address based tagged offset and the zero based tagged offset.

14. A method for handling memory accesses, comprising:
   advertising a memory region using a zero based tagged offset, the advertising of the memory region comprising advertising the memory region using a first base offset (FBO); and
   inserting, via a lower layer protocol application, information related to the FBO in a message advertising the memory region.

15. The method according to claim 14, comprising:
   storing a virtual address based tagged offset and the zero based tagged offset in a common format in a memory management system.

16. The method according to claim 14, comprising:
   using a common set of memory management algorithms for an application using a virtual address based tagged offset or an application using the zero based tagged offset.

17. The method according to claim 14, wherein an upper layer protocol application or an upper layer protocol device is unaware of the use of the FBO.

18. The method according to claim 14, wherein the advertising of the memory region uses the zero based tagged offset and the virtual address based tagged offset.

19. The method according to claim 14, wherein the lower layer protocol application uses remote direct memory access (RDMA).

20. A method for handling memory accesses, comprising:
   advertising a memory region using a zero based tagged offset, the advertising of the memory region comprising advertising the memory region using a first base offset (FBO); and
   inserting, via a lower layer protocol device, information related to the FBO in a message advertising the memory region.

21. The method according to claim 20, comprising:
   storing a virtual address based tagged offset and the zero based tagged offset in a common format in a memory management system.

22. The method according to claim 20, comprising:
   using a common set of memory management algorithms for an application using a virtual address based tagged offset or an application using the zero based tagged offset.

23. The method according to claim 20, wherein an upper layer protocol application or an upper layer protocol device is unaware of the use of the FBO.

24. The method according to claim 20, wherein the advertising of the memory region uses the zero based tagged offset and the virtual address based tagged offset.

25. The method according to claim 20, wherein the lower layer protocol device uses remote direct memory access (RDMA).

26. The method according to claim 20, wherein the lower layer protocol device comprises an RDMA interface.

27. The method according to claim 20, wherein the lower layer protocol device comprises a network interface card.

* * * * *